United States Patent [19]
Kraft

[11] Patent Number: 6,099,030
[45] Date of Patent: Aug. 8, 2000

[54] OCCUPANT PROTECTION SYSTEM

[75] Inventor: Anton Kraft, Idstein, Germany

[73] Assignee: General Motors Corporation, Detroit, Mich.

[21] Appl. No.: 08/926,196

[22] Filed: Sep. 9, 1997

[30] Foreign Application Priority Data

Sep. 12, 1996 [DE] Germany ............................ 196 37 108

[51] Int. Cl.⁷ .......................... B60R 21/32; B60K 28/00
[52] U.S. Cl. ............................................ 280/735; 180/272
[58] Field of Search ................................ 280/735, 734, 280/733, 801.1; 180/272

[56] References Cited

U.S. PATENT DOCUMENTS

| | | | |
|---|---|---|---|
| 5,330,226 | 7/1994 | Gentry et al. | 280/735 |
| 5,413,378 | 5/1995 | Steffens, Jr. et al. | 280/735 |
| 5,472,235 | 12/1995 | Dubay . | |
| 5,626,359 | 5/1997 | Steffens, Jr. et al. | 280/735 |
| 5,653,462 | 8/1997 | Breed et al. | 280/735 |
| 5,670,853 | 9/1997 | Bauer | 280/735 |
| 5,702,123 | 12/1997 | Takahashi et al. | 280/735 |
| 5,722,686 | 3/1998 | Blackburn et al. | 280/735 |
| 5,748,473 | 5/1998 | Breed et al. | 280/735 |
| 5,829,782 | 11/1998 | Breed et al. | 280/735 |
| 5,848,802 | 12/1998 | Breed et al. | 280/735 |
| 5,871,232 | 2/1999 | White | 280/735 |

FOREIGN PATENT DOCUMENTS

| | | |
|---|---|---|
| 473324A1 | 3/1992 | European Pat. Off. . |
| 3429764 | 2/1986 | Germany . |
| 4023109 | 1/1992 | Germany . |
| 4341500 | 6/1994 | Germany . |
| 4433601 | 4/1996 | Germany . |
| 3802159 | 9/1996 | Germany . |
| 2289332 | 11/1995 | United Kingdom . |
| WO94/22693 | 10/1994 | WIPO . |
| WO94/23973 | 10/1994 | WIPO . |

OTHER PUBLICATIONS

"A New Method for the Automatic On–Line, Cable Free Anaylsis of Human Gain", Dec. 1980, pp. 319 thru 323.

Primary Examiner—Lanna Mai
Assistant Examiner—Jeff Restifo
Attorney, Agent, or Firm—Kathryn A. Marra

[57] ABSTRACT

An occupant protection system, in particular for motor vehicles, is provided with at least one distance measuring device (12) for continuously monitoring the sitting position of an occupant (1) belted to a vehicle seat (4) by means of a safety belt (3), in relation to at least one air bag module (6) provided for this vehicle seat (4), wherein the safety belt (3) is passed over the chest portion of the occupant (1) and the distance measuring device (12) includes one or more transmitting and receiving devices (13, 14, 14*a*, 14*b*) for reflectable beams, for example light, ultrasonic or radar beams, as well as a method for continuously monitoring the sitting position of the occupant (1). Preferably, the distance measuring device (12) is designed for detecting one or more reference points or regions (7) of the safety belt (3) in the chest portion and the safety belt (3) is designed to reflect radiation in spots or sections for forming the reference points or regions (7) for distance measurement (12).

16 Claims, 1 Drawing Sheet

OCCUPANT PROTECTION SYSTEM

TECHNICAL FIELD

The invention relates to an occupant protection system with a distance measuring device for continuously monitoring the seating position of an occupant secured in a motor vehicle by a safety belt for determining air bag deployment.

BACKGROUND OF THE INVENTION

It is known in the prior art to provide an occupant protection system in which the position of the occupant is monitored to determine the preferred measure of air bag deployment. Accordingly, the prior art shows that the seating position of the occupant relative to the corresponding safety devices such as the air bag are monitored continuously by sensors and evaluated in a computer-supported system in order to derive the time and the extent of the protective measures to be initiated under certain predetermined vehicle conditions. The sensing of the position of the occupant is achieved by means of distance and positioning measuring devices which emit beams and receive them. A disadvantage to this prior art, however, is that the beams of the distance and position measuring devices directly scan the occupant or measurement. For example, incorrect measurement readings could be taken if an object, such as a map or newspaper, is located between the sensors and the occupant, since the measuring device cannot distinguish between the identity of different measurement surfaces.

SUMMARY OF THE INVENTION

The invention relates to an occupant protection system, especially for motor vehicles, with a distance measuring device for continuous monitoring of the seating position of an occupant secured in a motor vehicle by a safety belt in relation to at least one air bag provided for protection of the occupant seated in the vehicle seat. The occupant wears the safety belt which is guided over the chest portion of the occupant. The distance measuring device includes one or more transmitting and receiving devices for deflectable beams, for example such as light, ultrasonic or radar beams, and a process for the continuous monitoring of the seating position of the occupant.

Preferably, the distance measuring devices may operate electro-acoustically or with radio waves of short wavelength (radar waves) which are suitable for the measurement of the distance between the transmitting device and the safety belt. Preferably, the material of the safety belt includes beam-reflecting points or regions and the measurement is achieved by determining the distance-proportional time difference between the emission of the beam and the reception of the passively reflected beam (travel time measurement). With this process, the transmitting device can also be used as a receiving device.

For transmitting and receiving beams in this case magnetostrictively or piezoelectrically acting oscillators or transmitting and receiving antennas for electromagnetic beams may be used. The reflected beams are received by the receiving device and transformed into voltage fluctuations or electrical signals which are converted in an electronic device for determining the safety measures, such as level of air bag deployment or nondeployment, to be initiated and evaluated. By the spatial alignment of such a transmitting/receiving device or a directional focusing of the beam, in a simple way the monitored reference points or regions on the safety belt in the chest portion can be detected. With this design, the material of the safety belt can preferably include a large area with a beam reflecting material to assure detection of this beam reflecting material of the safety belt in the case of occupants of various sizes.

Advantageously by the safety belt preferably being made of beam reflective material whose reference points or regions are directly detectable by the beams of the distance measuring device, the transmitting power of the transmitting device can be lowered and the quality of the reflected beams can be substantially improved without disturbances in the functional mode of the distance measuring device caused by undesired reflections from the interior space of the motor vehicle. As a result, the seating position of the occupant and therefore also a predetermined minimum safety distance, such as from the air bag module, can be determined and monitored much more accurately than is possible according to the prior art.

BRIEF DESCRIPTION OF THE DRAWINGS

An embodiment of the present invention will now be described, by way of example, with reference to the accompanying drawing in which.

DESCRIPTION OF THE PREFERRED EMBODIMENT

Figure 1:
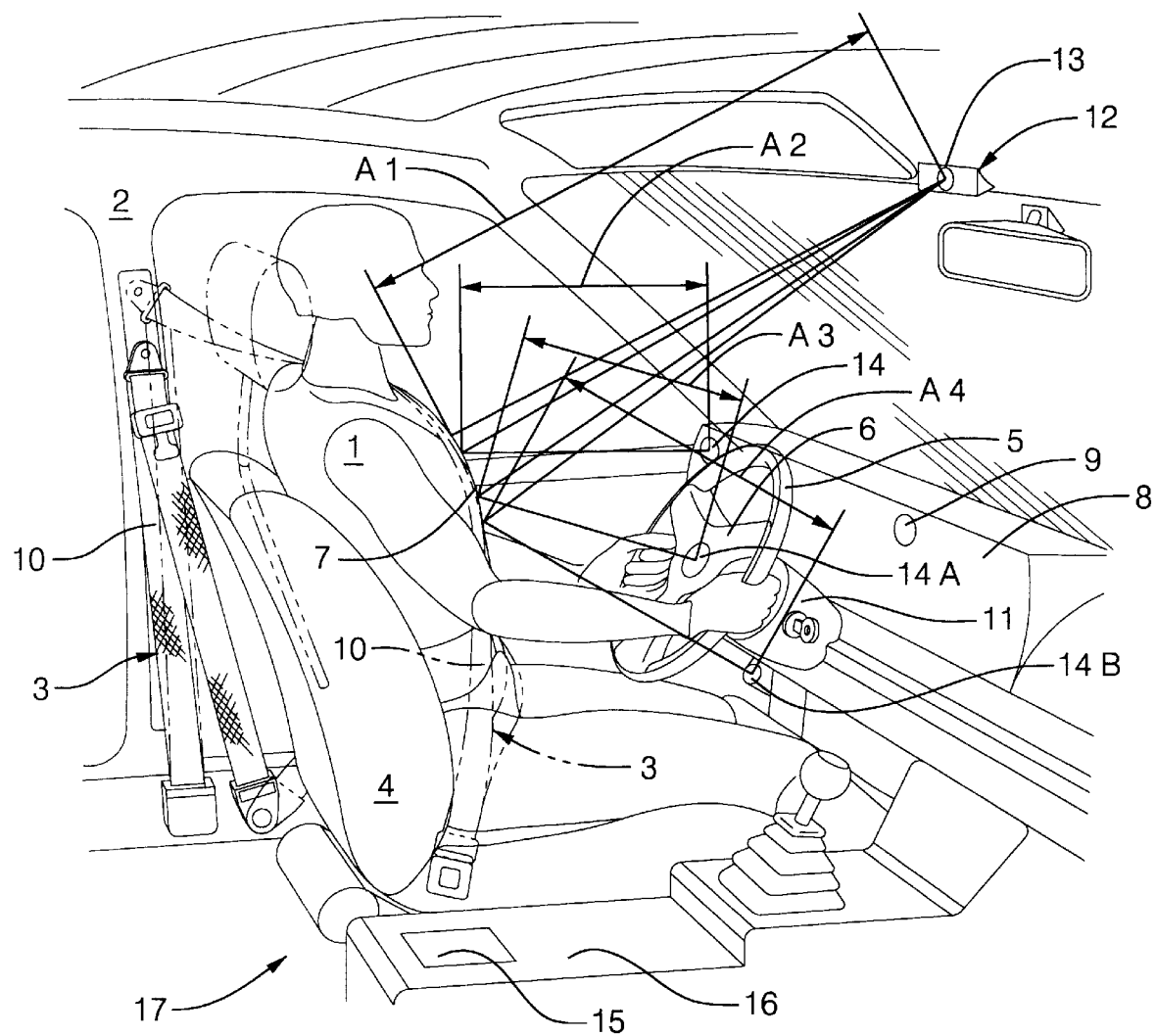
FIG. 1 shows a partially schematic, three-dimensional representation of an interior of a motor vehicle with an occupant secured by a safety belt and wherein the safety belt is guided diagonally across the chest portion of the occupant in a used position, with the unused position of the safety belt shown in solid lines and with the safety belt shown in phantom lines in the used position.

Referring to FIG. 1, a motor vehicle 2 includes a vehicle interior 17 including a vehicle seat 4 in which an occupant 1 is seated. An occupant protection system is generally designated as 20 and generally includes an air bag module 6, a safety belt 3, and a distance measuring device 12, as described further hereinafter. The air bag module 6 is arranged on the steering wheel 5 for deployment in the case of a frontal collision for protection of the occupant 1 under certain predetermined conditions. The air bag module 6 typically deploys between the steering wheel 5 or the steering column 11 by unfolding during inflation by discharge of inflation gas provided by an inflator (not shown). The air bag module 6 is constructed in such a way that it can be inflated at different speeds and degrees or with a controlled quantity of gas in any suitable manner. The vehicle interior 17 includes an instrument panel 8 located generally forward of the vehicle occupant 1.

The interior 17 further includes a safety belt 3 which has an unused position in which the safety belt 3 hangs at the side of the vehicle 2 and a used position as shown in phantom in FIG. 1. In the used position, a portion of the safety belt 3 extends generally over the chest portion of the occupant 1. The chest portion generally refers to the chest and/or torso and/or shoulder region of the occupant 1 and may include any combination thereof from which distances are desired to be measured. The safety belt 3 is made of a belt material 10 which is preferably a woven fabric material. Most preferably, the belt material 10 includes a beam-reflective layer or reflective portions incorporated into the belt material 10, which may include metal threads or foils worked or woven into the belt material 10 or a radiation reflecting die included as part of the belt material 10. Most preferably, the present invention is used when the vehicle occupant 1 wears the safety belt 3 in the properly used position. The safety belt 3 includes one or more reference regions 7 from which variable distances A1, A2, A3, and A4 are measured, as described further below. The reference region 7 is preferably located around the chest portion of the occupant 1 when the safety belt 3 is in the used position. It will be appreciated that the reference region 7 preferably includes portions of the belt material 10 which incorporate the reflective layer as part of the belt material 10 in that reference region 7 which is preferably designed to reflect radiation for distance measurement. It will further be appreciated that the reference region 7 may extend continuously over a large portion of the safety belt 3 or may be provided at intermittent points along the safety belt 3.

The interior 17 of the motor vehicle 2 further includes a distance measuring device 12 which preferably operates on the principle of ultrasonic distance measurement by reflected beams. The measuring device 12 essentially includes a transmitting and receiving device 13, an electronic device 15 and several other receiving devices 14, 14a, 14b. With the aid of the distance measuring device 12, the variable distances A1, A2, A3, A4, are continuously determined and monitored. In each case, the variable distances A1, A2, A3, A4 extend approximately between the reference region 7 of the safety belt 3 being scanned by beams and one of the transmitting and receiving device 13 (A1), the instrument panel 8 (A2), the steering wheel 5 (A3) and the steering column 11 (A4).

To improve the quality and intensity of the reflected beams, the safety belt 3 in the chest portion of the occupant 1 is provided over a greater part of its area with the belt material 10 including the beam-reflective layer, provided within the belt material 10 such as by metal threads, metal foil, or reflective dye incorporated into the belt material 10 of the safety belt 3.

From the determined distances A1, A2, A3, A4, an instantaneous distance between a certain reference point or segment of the safety belt 3 in the reference region 7 scanned by the beam and the air bag module 6 is calculated and compared with a predetermined minimal safety distance which should not be gone below in order to provide the maximal protective effect of the air bag module 6 in the case of an accident during the operation of the motor vehicle 2. Advantageously, the distance measuring device 12 is preferably constructed in such a way that in the case of the temporary covering of one or more receiving devices, 14, 14a, 14b, e.g., by a steering hand of the occupant 1, the instantaneous distance is calculated with the aid of the uncovered receiving devices 14, 14a, or 14b. While one transmitting device 13 and three receiving devices 14, 14a and 14b are shown, it will be appreciated that any number of transmitting receiving devices could be used.

If the occupant 1 should occupy a seating position where the instantaneous distance is less than the predetermined safety distance, then the occupant 1 may be optically and acoustically notified of this situation by a signaling device 9 located on the instrument panel 8 and requested to change the seating position. It will appreciated that this notification could be either optical or acoustic or that the notification could also be eliminated, if desired. If deployment of the air bag module 6 is triggered when the occupant 1 is seated closer than the predetermined safety distance, the air bag module 6 will be signaled by the electronic device 15 to deploy at a less forceful degree or perhaps to not deploy at all. The electronic device 15 may be located in various vehicle locations, but is preferably arranged in the region of a central tunnel 16 of the vehicle 2. The electronic device 15 is preferably designed as an integral or modular component of a central control device for all restraining systems of the vehicle 2 or of a vehicle computer.

Instead of the transmitting and receiving devices 13, 14, 14a, 14b, transmitting and receiving ultrasonic sensors may be provided whose signals are evaluated as described above by the electronic device 15. Since the ultrasonic sensors may be designed only for the reception of the beams reflected from the safety belt 3 having belt material 10 including the beam-reflective layer, a high reliability and functional capacity of the occupant protection system is assured. It will be appreciated that the reflectable beams transmitted from the distance measuring device 12 may include ultrasonic, radar, light or other suitable beams.

While the present invention has been described as carried out in a specific embodiment thereof, it is not intended to be limited thereby, but is intended to cover the invention broadly within the scope and spirit of the claims.

What is claimed is:

1. An occupant protection system for use in motor vehicles, the system including a safety belt for restraint of a vehicle occupant having a chest portion, the vehicle occupant being belted in a vehicle seat in a sitting position with the safety belt positioned generally over the chest portion of the occupant in a used position, the system including at least one air bag module associated with the vehicle occupant, the occupant protection system comprising:

the safety belt including at least one reference region comprised of a beam-reflective layer; and at least one distance measuring device for continuously monitoring the position of the belted occupant belted in relation to the at least one air bag module, the distance measuring device including one or more transmitting and receiving devices for transmitting and receiving reflectable beams, respectively, the distance measuring device being designed for detecting the reference region of the safety belt in the chest portion; and the beam-reflective layer of the reference region of the safety belt for reflecting the reflectable beams for distance measurement.

2. The occupant protection system according to claim 1 characterized in that the beam-reflective layer includes metal threads woven into the belt material of the safety belt at the reference region.

3. The occupant protection system according to claim 1 characterized in that the beam-reflective layer includes metal foil woven into the belt material of the safety belt at the reference region.

4. The occupant protection system according to claim 1 characterized in that the beam-reflective layer includes a radiation-reflecting dye incorporated in the belt material in the reference region.

5. The occupant protection system according to claim 1 characterized in that the belt material of the safety belt is designed for reflecting the reflectable beam at least in the direction of the transmitting and receiving devices.

6. The occupant protection system of claim 1 characterized in that the reference region on the safety belt is determined by selective spatial orientation of the transmitting and receiving devices.

7. The occupant protection system according to claim 1 characterized in that the transmitting and receiving devices are designed to monitor whether the safety belt is in the used position.

8. The occupant protection system according to claim 1 characterized in that an electronic device connected to the transmitting and receiving devices is provided for sending results of distance measurement and signaling the air bag module for various levels of deployment.

9. The occupant protection system according to claim 1 characterized in that the vehicle includes an instrument panel and wherein at least one of the distances measured by the distance measuring device extends between the reference region of the safety belt and the instrument panel.

10. The occupant protection system according to claim 1 characterized in that the vehicle includes a steering wheel and wherein at least one of the distances measured by the distance measuring device extends between the reference region of the safety belt and the steering wheel.

11. The occupant protection system according to claim 1 characterized in that at least one of the distances measured by the distance measuring device extends between the reference region of the safety belt and the transmitting and receiving device.

12. The occupant protection system according to claim 1 wherein the vehicle includes a steering wheel and wherein the system includes at least one receiving device mounted on the steering wheel.

13. The occupant protection system according to claim 1 wherein the vehicle includes an instrument panel and wherein the system includes at least one receiving device mounted on the instrument panel.

14. A method for continuously monitoring a sitting position of an occupant belted to a vehicle seat by a safety belt in relation to at least one air bag module positioned for protection of the vehicle occupant in a vehicle, the safety belt having at least one reference region including a beam-reflective material, the method comprising the steps of:

providing at least one distance measuring device for continuously monitoring the position of the belted occupant in relation to the at least one air bag module by transmitting and receiving reflectable beams onto the reference region of the safety belt; and providing an electronic device connected to the distance measuring device for evaluating and converting the results of the distance measurement and for signaling the air bag module for various predetermined levels of deployment based on those results.

15. The method of claim 14 wherein signaling the air bag module includes signaling the air bag module to provide a reduced level of deployment when the distance measurement falls below a predetermined safety distance between the occupant and the airbag.

16. The method of claim 14 further comprising the step of triggering an occupant warning when the distance measurement falls outside a predetermined safety distance between the occupant and the air bag module.

* * * * *